(12) United States Patent
Crews

(10) Patent No.: US 7,160,842 B2
(45) Date of Patent: *Jan. 9, 2007

(54) POLYOLS FOR BREAKING OF FRACTURING FLUID

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 259 days.

This patent is subject to a terminal disclaimer.

(21) Appl. No.: 10/627,091

(22) Filed: Jul. 25, 2003

(65) Prior Publication Data

US 2004/0127367 A1    Jul. 1, 2004

Related U.S. Application Data

(63) Continuation-in-part of application No. 09/900,343, filed on Jul. 3, 2001, now Pat. No. 6,617,285.

(51) Int. Cl.
*C09K 8/52* (2006.01)
*C09K 8/68* (2006.01)

(52) U.S. Cl. .............. 507/209; 507/211; 507/261; 507/266; 507/921; 516/113

(58) Field of Classification Search ........... 507/209, 507/211, 261, 266, 921; 516/113
See application file for complete search history.

(56) References Cited

U.S. PATENT DOCUMENTS

| | | | |
|---|---|---|---|
| 3,079,332 A | 2/1963 | Wyant | |
| 3,096,284 A * | 7/1963 | Slate | ............ 507/211 |
| 3,215,634 A | 11/1965 | Walker | |
| 3,346,556 A | 10/1967 | Foster | |
| 3,800,872 A | 4/1974 | Friedman | |
| 4,946,604 A | 8/1990 | Smith | |
| 5,067,566 A | 11/1991 | Dawson | |
| 5,082,579 A | 1/1992 | Dawson | |
| 5,143,157 A * | 9/1992 | Harms | ............ 166/300 |
| 5,145,590 A | 9/1992 | Dawson | |
| 5,160,445 A | 11/1992 | Sharif | |
| 5,160,643 A | 11/1992 | Dawson | |
| 5,247,995 A | 9/1993 | Tjon-Joe-Pin et al. | |
| 5,310,489 A | 5/1994 | Sharif | |
| 5,372,732 A | 12/1994 | Harris et al. | |
| 5,460,226 A | 10/1995 | Lawson et al. | |

(Continued)

OTHER PUBLICATIONS

H. Deuel, et al., "Reaction of Boric Acid with Polysaccharides," Nature, Jan. 17, 1948, pp. 96-97, vol. 161, No. 4081.

(Continued)

*Primary Examiner*—Philip C. Tucker
(74) *Attorney, Agent, or Firm*—Madan Mossman & Sriram PC

(57) ABSTRACT

It has been discovered that fracturing fluid breaker mechanisms are improved by the inclusion of a polyol alone that directly degrades the polysaccharide backbone, and optionally additionally by removing the crosslinking ion, if present. That is, viscosity reduction (breaking) occurs by breaking down the chemical bonds within the backbone directly, rather than by merely removing the crosslinking ion, if present. The gel does not have to be crosslinked for the method of the invention to be successful, although it may be crosslinked. In one non-limiting embodiment, the polyol has at least two hydroxyl groups on adjacent carbon atoms. In another embodiment, the polyols are monosaccharides such as glycerols and sugar alcohols, and may include mannitol, sorbitol, glucose, fructose, galactose, mannose, lactose, maltose, allose, etc. and mixtures thereof.

33 Claims, 12 Drawing Sheets

U.S. PATENT DOCUMENTS

| | | | |
|---|---|---|---|
| 5,658,861 | A | 8/1997 | Nelson et al. |
| 5,827,804 | A | 10/1998 | Harris et al. |
| 5,877,127 | A | 3/1999 | Card et al. |
| 6,060,436 | A | 5/2000 | Snyder et al. |
| 6,177,385 | B1 | 1/2001 | Nimerick |
| 6,617,285 | B1 * | 9/2003 | Crews .................. 507/201 |
| 2003/0134751 | A1 | 7/2003 | Lee et al. |
| 2004/0242430 | A1 | 12/2004 | Griffin et al. |
| 2005/0061502 | A1 | 3/2005 | Hanes, Jr. et al. |

OTHER PUBLICATIONS

"Gelling Mud Slurry by Adding Polymer," Derwent/WPI Abstract, 1976-73139X/197639 to JP 51092508.

E.H. Ajandouz, et al., "Effects of pH on Caramelization and Maillard Reaction Kinetics in Fructose-Lysine Model Systems," J. Food Science, 2001, pp. 926-931, vol. 66, No. 7.

"Sugar Technology" Available from: http://www.geocities.com/bimbimbim88/sugar_technology.htm, Apr. 7, 2003.

C.G.A. Davies & T. P. Labuza, "The Maillard Reaction Application to Confectionary Products," pp. 1-33. Available from: http://www.fsci.umn.edu/Ted_Labuza/PDF_files/papers/maillard-confectionary.pdf, May 20, 2003.

Lehninger, "Chapter 9: Carbohydrates and Glycobiology," pp. 293-303. Available from: http://www.icb.ufmg.br/-lbcd/cromatina/Lehninger/lehn09.pdf, May 20, 2003.

\* cited by examiner

B9 Emerald FRAQ™ 30 With ADM 62/43 Breaker at 150 F

B9 Emerald FRAQ™ 30 With ADM 62/43 Breaker at 125 F

Polyol Fluid pH After 16 Hours at 200 F
30 pptg Borate Crosslinked Guar Fluid

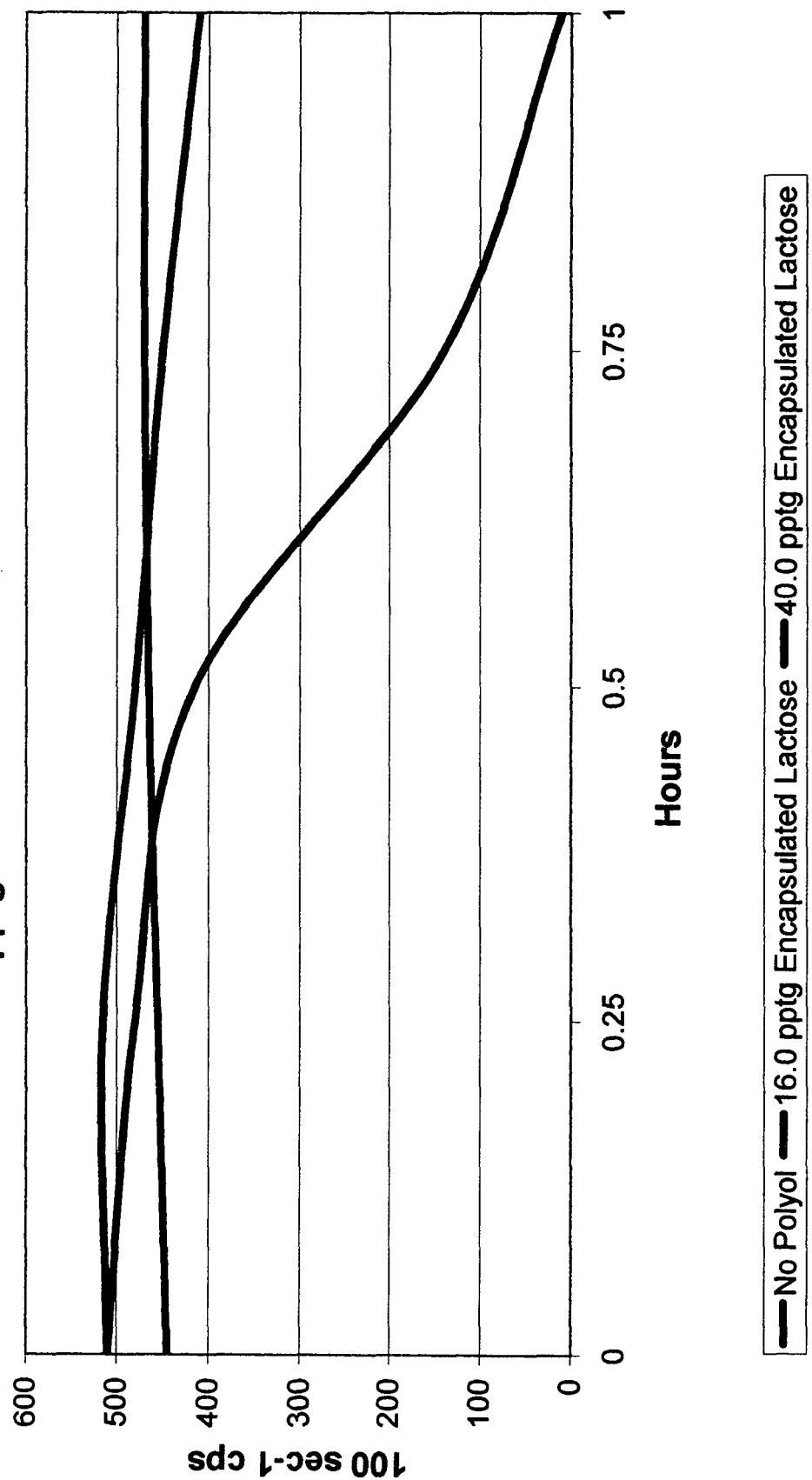

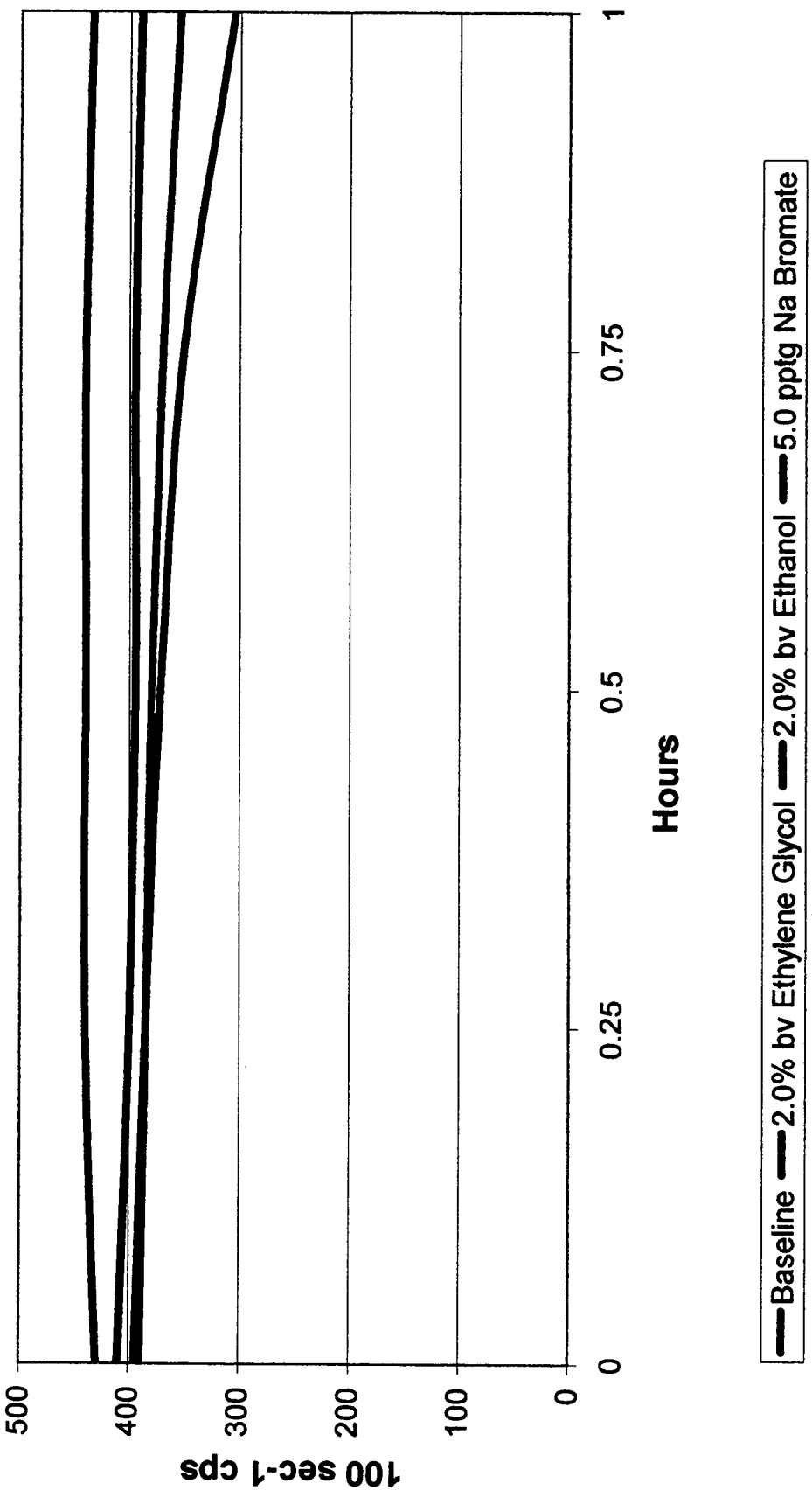

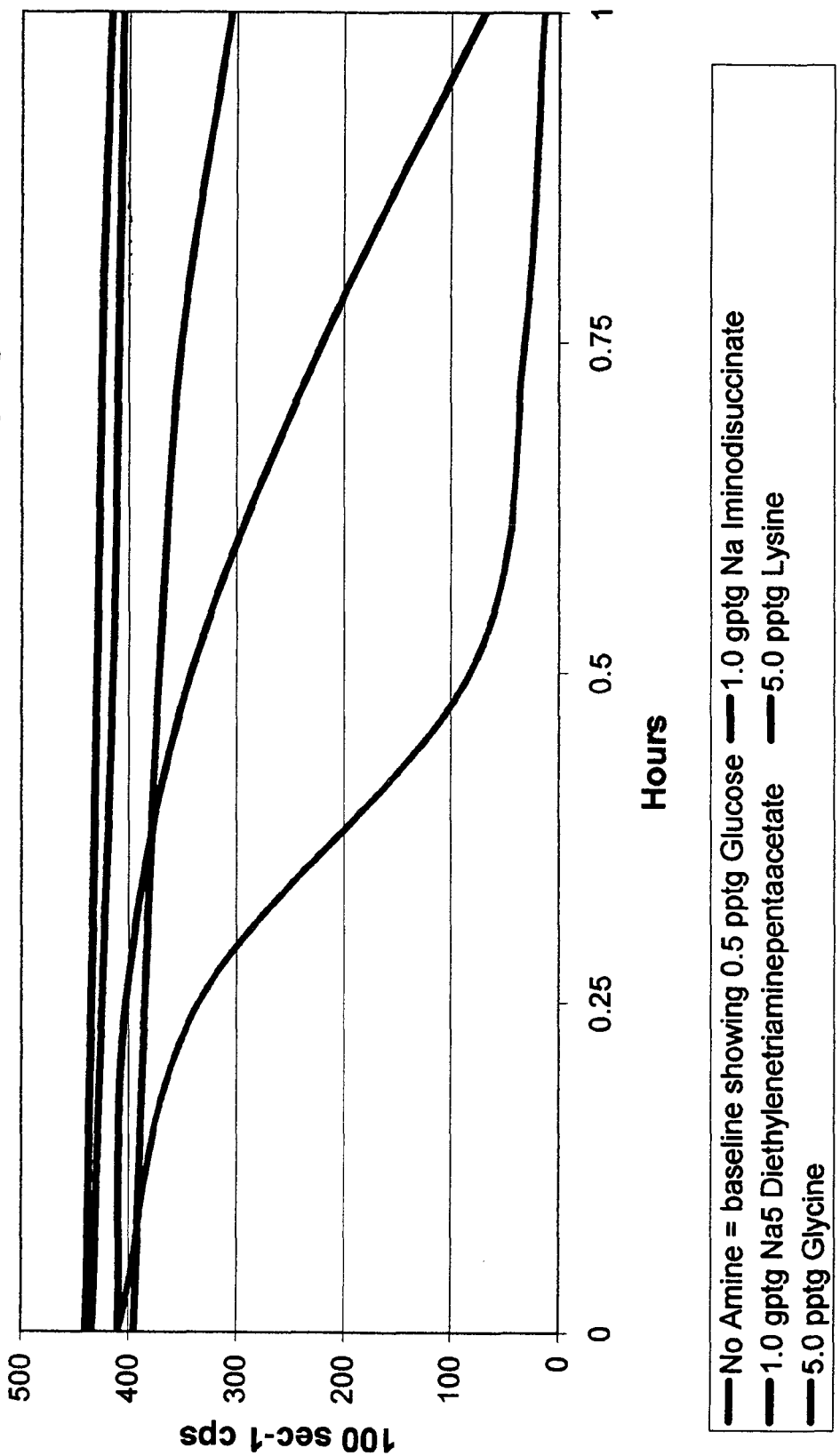

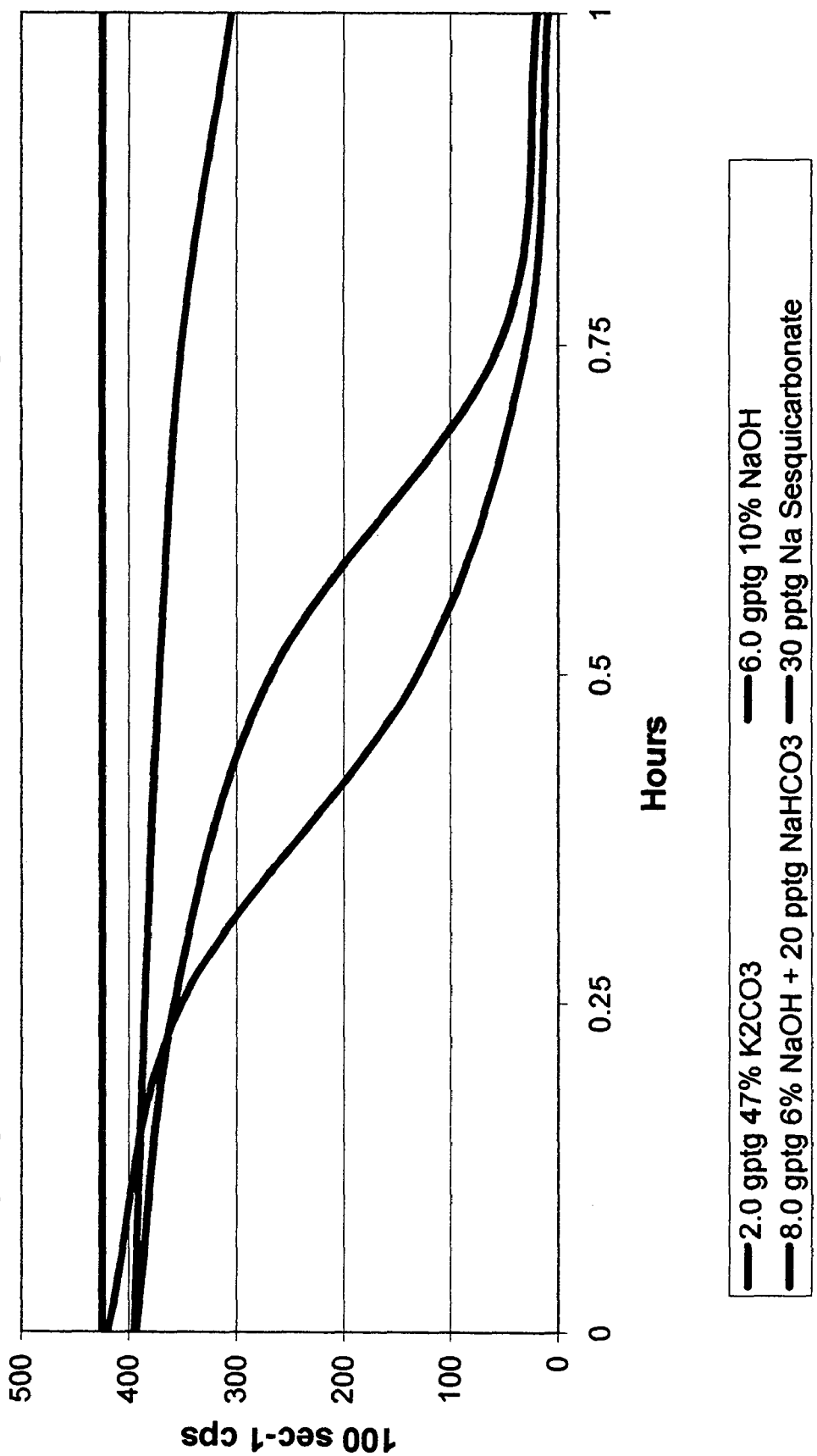

US 7,160,842 B2

POLYOLS FOR BREAKING OF FRACTURING FLUID

CROSS-REFERENCE TO RELATED APPLICATION

This application is a continuation-in-part of U.S. patent application Ser. No. 09/900,343 filed Jul. 3, 2001, issued Sep. 9, 2003 as U.S. Pat. No. 6,617,285 B2.

FIELD OF THE INVENTION

The present invention relates to gelled treatment fluids used during hydrocarbon recovery operations, and more particularly relates, in one embodiment, to methods of "breaking" or reducing the viscosity of treatment fluids containing gelling agents used during hydrocarbon recovery operations.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity. One disadvantage of enzyme breakers is that they tend to be relatively expensive. Oxidizer breakers are relatively less expensive, but can be dangerous if not handled properly, and further have a technical gap of not being useful between about 160 to about 230° F. (about 71 to about 110° C.).

It would be desirable if a viscosity breaking system could be devised to break fracturing fluids gelled with borate crosslinked polymers by directly breaking down the polysaccharide backbone, whether or not the backbone is crosslinked.

SUMMARY OF THE INVENTION

Accordingly, it is an object of the present invention to provide a method for breaking the viscosity of polymer-gelled aqueous treatment fluids used in hydrocarbon recovery operations.

It is another object of the present invention to provide a composition and method for breaking polysaccharide gelled aqueous fluids by breaking down the polysaccharide backbone directly.

Still another object of the invention is to provide a method and composition for breaking the viscosity of aqueous fluids gelled with polymers that can provide better clean up of the crosslinked polymer.

In carrying out these and other objects of the invention, there is provided, in one embodiment of the invention a method for breaking viscosity of aqueous fluids gelled with polysaccharides that involves adding to an aqueous fluid gelled with at least one polysaccharide, at least one low molecular weight polyol; and then subjecting the polymer and the polyol to heat for an effective period of time and where the concentration of the polyol is effective to break down the polymer backbone directly.

In other non-limiting embodiments of the invention, the methods and compositions for breaking the viscosity of aqueous fluids gelled with polysaccharides do not require lowering the pH of the fluid, and further do not require removing or sequestering any crosslinking ions, particularly any borate or other ions. In another non-limiting embodiment of the invention, the methods and compositions do not require the use of an enzyme.

BRIEF DESCRIPTION OF THE DRAWINGS

FIG. 11 is a graph of viscosity as a function of time showing how 30 pptg borate crosslinked guar can be broken by encapsulated lactose at two different concentrations;

FIG. 12 is a graph of viscosity as a function of time showing how some chemicals negatively influence polyol breaking process with borate crosslinked guar;

FIG. 13 is a graph of viscosity as a function of time showing how amine compounds can slow or enhance the polyol breaking activity; and FIG. 14 is a graph of viscosity as a function of time showing how glucose breaking activity can be influenced by the type of pH buffers used within a polysaccharide fluid system.

DETAILED DESCRIPTION OF THE INVENTION

Figure 1:
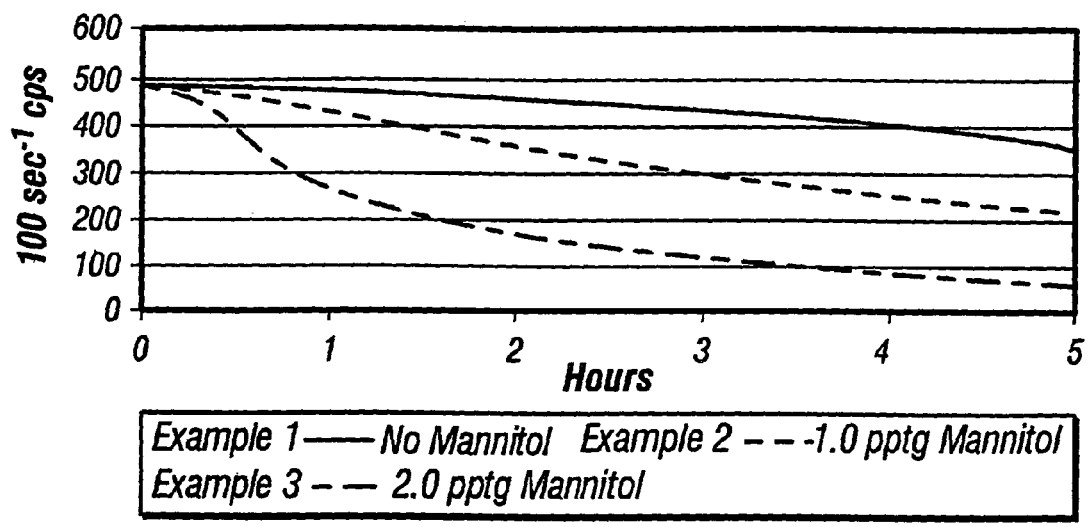
FIG. 1 is a graph of the effects of mannitol on ND30FW at 175° F. (79° C.)

A unique fracturing fluid breaker mechanism in which the fracturing fluid's viscosity is reduced (or is "broken") by use of polyols has been discovered. It is not necessary, and in some cases not desirable, for oxidizer or enzyme breakers to also be present in the methods of this invention. In the context of this invention, polymer degradation is dependent primarily on the type and amount of polyol, the fluid pH and fluid temperature. Other physical and chemical conditions also have a role in the breaking activity of the polyols on polysaccharide gelled fluids, including whether the polymer fluid is crosslinked (has a three dimensional structure), and whether there are present glycols, alcohols, amino acids, and the like, and in what proportion these other components are present and mixtures thereof.

The polyols of this invention are defined in one non-limiting embodiment as polyols having at least one hydroxyl group on two adjacent carbon atoms. The adjacent carbon atoms may have more than one hydroxyl group, and the polyol may have more that two adjacent carbon atoms, each having at least one hydroxyl group. In another embodiment of the invention, the polyols are monosaccharides, which are glycerols (trihydric monosaccharides having three hydroxyl groups) and sugar alcohols (having more than three hydroxyl groups) and oligosaccharides. In another embodiment of the invention, the polyols may have one of the following formulae:

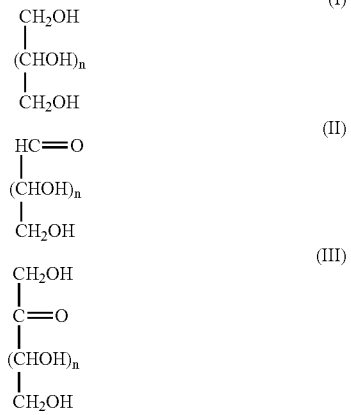

where n is from 2 to 5, and the hydroxyls may be in the cis or trans orientation. In another embodiment of the invention, the polyols are acids, acid salts, fatty acids (alkyl glycosides), and alcohol, alkyl and amine derivatives (glycosylamines) of monosaccharides and oligosaccharides. Specific examples of polyols falling within these definitions include, but are not necessarily limited to, mannitol (manna sugar, mannite), sorbitol (D-sorbite, hexahydric alcohol), xylitol, glycerol, glucose, (dextrose, grape sugar, corn sugar), fructose (fruit sugar, levulose), maltose, lactose, tagatose, psicose, galactose, xylose (wood sugar), allose (β-D-allopyranose), ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethyl-hexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof. In one non-limiting embodiment of the invention, the molecular weight of the simple polyols may range from about 65 to about 500, where an alternate embodiment for the molecular weight ranges from about 90 to about 350. Useful oligosaccharides may have molecular weights ranging from about 450 to about 5000 in one non-limiting embodiment, with most ranging from about 480 to about 1000 in another non-limiting embodiment.

In one non-limiting embodiment of the invention, the useful low molecular weight polyols of the invention have an absence of non-reducing sugars. In another non-limiting embodiment, the useful low molecular weight polyols have an absence of non-reducing disaccharides and non-reducing trisaccharides. The definition of "non-reducing" is the same as that given in U.S. Pat. No. 4,946,604, incorporated by reference herein. In another non-limiting embodiment of the invention, non-reducing sugars are acetals and ketals having the structural element:

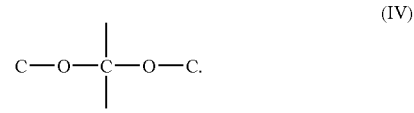

It will be appreciated that derivatives of these relatively simple polyols will also find use in the inventive methods and compositions. Suitable derivatives include, but are not necessarily limited to, acid, acid salt, alcohol, alkyl, and amine derivatives of these saccharides, and mixtures of polyols and/or the derivatives thereof. Specific examples of suitable derivatives include, but are not necessarily limited to, alkyl glucosides, alkyl polyglucosides, alkyl glucosamides, alkyl glucosamines, alkyl sorbitans, alkyl sorbitols, alkyl glucopyranosides, alkyl maltosides, alkyl glycerols and mixtures thereof.

The use of simple sugars, acid sugars, acid sugar salts, alcohol sugars, alkyl glycosides, and glycosylamines to complex or chelate borate ions of the gelled polysaccharides lowers the pH of the borate crosslinked fluid and thus its viscosity. The lowering of the fluid's pH will also allow enzyme breaker activity to increase for faster fracturing fluid breaks. In fact, it has been surprisingly discovered that the use of the polyols together with enzymes gives synergistically better results than when a polyol or an enzyme are used separately or than would be expected if the effects of these components were merely added separately.

In the optional case where enzymes are used, the use of the chemical technology of this invention will allow enzymes to work at a faster rate over time. It will allow the use of lower amounts of enzyme to break the fluid, resulting in cost savings to the well operator. It will also permit the use of enzyme breakers at lower reservoir temperatures in the borate crosslinked fluids as compared with what has been the practice or ability of oilfield service companies up to this time for borate crosslinked fluids.

While some polyols have been used previously to delay the gellation of fracturing fluids, it is believed that the use of these polyols to break the gel of the fracturing fluid by controlling the type and amount of polyol, particularly when used in conjunction with enzymes, is novel. The method of the invention involves controlled gel breaking, and can be achieved by using the polyol alone, or together with an enzyme breaker. In the embodiment where the enzyme is also used, the method and composition of the invention differ from that used previously by the mechanism employed to lower the borate-crosslinked fracturing fluid's pH to activate and/or accelerate the enzyme's breaking activity on the gel. Further, the amounts of polyols used in the method of this invention are lower than those used in the prior art where some of such polyols are used to delay gelling in the first place. In non-limiting embodiments, the amounts of polyols used in the methods of this invention may be up to one-twentieth (1/20) as low as what has been previously used. Further, the use of the polyols of this invention permit the breaking of gels over a wider temperature range than is possible with some prior art methods. The polyols of this invention may be used with enzymes up to about 230° F. (110° C.), in another non-limiting embodiment of this invention the polyols may be used in the range of from about 160 to about 230° F. (about 71 to about 110° C.).

Once the pH starts to be lowered through the prescribed mechanism of liberating the borate ions from the gel by the polyols, breaking (viscosity reduction) occurs by uncrosslinking of the fracturing fluid, and by liberating the crosslinking ion, e.g. borate as well, if present. In general, the lower that the pH shifts through the use of a borate ion sequestering product, the more effective and complete the above-listed breaking mechanisms can be. In other words, because more than one mechanism is used in some cases, a more complete break may be obtained. Complete borate uncrosslinking and up to 80 to near-100 percent backbone reduction (polysaccharide chain degradation) can be achieved with the selection and proper use of a polyol breaker.

It will be appreciated that breaking of the gel by reducing the pH of the fluid and removing at least a portion of the borate ion (if present) from the crosslinked polymer and attacking the polysaccharide backbone directly do not happen instantaneously or when the polyol is added to the fluid, nor should it. Rather, these mechanisms act over time or eventually. This time delay is necessary to complete the fracturing portion of the operation and the optional setting of the proppant. The time delay will also vary depending on the particular requirements of each individual fracturing job and cannot be specified in advance.

A value of the invention is that a fracturing fluid can be designed to have enhanced breaking characteristics. Importantly, better clean-up of the crosslinked polymer from the fracture and wellbore can be achieved thereby. Better clean-up of the crosslinked polymer directly influences the success of the fracture treatment, which is an enhancement of the well's hydrocarbon productivity.

Most conventional borate crosslinked fracturing fluids and breakers are designed from a fixed crosslinked fluid pH value at ambient and/or reservoir temperature. By having products that can lower the pH of the fracturing fluid at reservoir temperature, such as the materials of the invention, the breaking of the fluid can be enhanced beyond existing conventional materials or methods for fracturing. Uncrosslinking of the gel, more effective use of the enzyme breaker, and higher enzyme concentration can be used. The result is more enhanced breaking of the fracturing fluid over conventional materials and methods, which gives better clean-up of the crosslinked polymer from the fracture and wellbore.

One advantage of the polyol breakers of this invention is that they have little, if any toxicity or environmental concerns, and thus, are safer to ship, handle and use as compared with some alternative breakers. The polyol breakers of this invention have another advantage of being relatively less expensive than conventional enzyme breakers. Oxidizer breakers are also relatively inexpensive, but they have a technical gap of not being useful from about 160 to about 230° F. (about 71 to about 110° C.).

In order to practice the method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time sufficient to form a hydrated solution. The hydratable polymer that is useful in the present invention can be any of the hydratable polysaccharides having galactose or mannose monomer units and are familiar to those in the well service industry. These polysaccharides are capable of gelling in the presence of a crosslinking agent to form a gelled base fluid. For instance, suitable hydratable polysaccharides are the galactomannan gums, guars and derivatized guars. Specific examples are guar gum and guar gum derivatives. The preferred gelling agents are guar gum, hydroxypropyl guar and carboxymethyl hydroxypropyl guar. The most preferred hydratable polymers for the present invention are guar gum and carboxymethyl hydroxypropyl guar and hydroxypropyl guar.

The amount of polysaccharide included in the fracturing fluid is not particularly critical so long as the viscosity of the fluid is sufficiently high to keep the proppant particles suspended therein during the fluid injecting step. Thus, depending on the application, the hydratable polymer is added to the aqueous fluid in concentrations ranging from about 15 to 60 pounds per thousand gallons (pptg) by volume of the total aqueous fluid (1.8 to 7.2 kg/m$^3$). The most preferred range for the present invention is about 20 to about 40 pptg (2.4 to 4.8 kg/m$^3$).

In addition to the hydratable polymer, the fracturing fluids of the invention may optionally include a crosslinking agent, such as a borate crosslinking agent. The crosslinking agent can be any of the conventionally used borate crosslinking agents that are known to those skilled in the art. This includes any of the boron salts or boric acid as borate crosslinking agents. Guar and derivatized guar gels, which are crosslinked by the addition of borate ion donating materials are preferred within this embodiment over other crosslinking agents because they clean up faster and yield higher sand pack permeability than guar gels crosslinked with other crosslinking agents. However, other crosslinking agents can be used with this embodiment besides borate, which may include, but are not limited to, titanates, zirconates, and other metallic and semi-metallic crosslinkers.

In the case of borate crosslinkers, the crosslinking agent is any material that supplies borate ions into solution. The amount of borate ions in solution is dependent on pH. Thus, the crosslinking agent can be any convenient source of borate ions, for instance the alkali metal and the alkaline earth metal borates and boric acid. A preferred crosslinking additive is preferably a common type of borax present in the range from about 0.25 to in excess of 10.0 pptg of the total aqueous fluid (0.03 to in excess of 1.2 lb/m$^3$). Preferably, the concentration of crosslinking agent is in the range from about 1.0 to about 3.0 pptg (0.12 to 0.34 kg/m$^3$) by volume of the total aqueous fluid.

Propping agents are typically added to the base fluid just prior to the addition of the crosslinking agent. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120–1700 kg/m$^3$) of fracturing fluid composition, but higher or lower concentrations can be used as the fracture design requires. The base fluid can also contain other conventional additives common to the well service industry such as surfactants, biocides, non-emulsifiers and the like.

In one non-limiting embodiment of the invention, the suitable polyol materials for use in the invention include those described above, such as monosaccharides, oligosaccharides, and their acid, acid salt, alcohol, alkyl, and amine derivatives, in one non-limiting embodiment of the invention. In a different preferred embodiment, polyols of formulae (I), (II), and (III), are preferred in another non-limiting embodiment of the invention.

Any or all of the above polyol materials may be provided in an extended release form such as encapsulation by polymer or otherwise, pelletization with binder compounds, absorbed on a porous substrate, and a combination thereof. Specifically, the materials may be encapsulated to permit slow or timed release of the polyol materials. In non-limiting examples, the coating material may slowly dissolve or be removed by any conventional mechanism, or the coating could have very small holes or perforations therein for the material within to diffuse through slowly. For instance, polymer encapsulation coatings such as used in fertilizer technology available from Scotts Company, specifically POLY-S® product coating technology, or polymer encapsulation coating technology from Fritz Industries could possibly be adapted to the methods of this invention.

It is difficult, if not impossible, to specify with accuracy the amount of the polyol that should be added to a particular aqueous fluid gelled with borate crosslinked polymers to fully break the gel, in general. For instance, a number of factors affect this proportion, including but not necessarily limited to, the particular polymer used to gel the fluid; the particular polyol used to break the gel; the temperature of the fluid; the starting pH of the fluid; whether an enzyme breaker is also used; the particular nature of the enzyme breaker, if present; the concentration of the enzyme; the nature and the concentration of the pH buffers; and the complex interaction of these various factors. Nevertheless, in order to give an approximate feel for the proportions of the polyol to be used in the method of the invention, the amount of material added may range from about 0.1 to about 30.0 pptg (about 0.012 to about 3.4 kg/m$^3$), based on the total weight of the fluid; preferably from about 0.5 to about 30.0 pptg (about 0.06 to about 3.4 kg/m$^3$); most preferably from about 1.0 to about 20.0 pptg (about 0.12 to about 2.4 kg/m$^3$).

It will be appreciated that in some embodiments of the invention, the amount of polyol necessary to break a particular polysaccharide-gelled aqueous fluid will depend upon the particular polyol used. The speed at which a particular low molecular weight polyol acts can depend upon whether it is an altose or a ketose, that is, where the carbonyl group is on the polyol. For instance, if fructose is used, the amount of fructose added ranges from about 0.01 to about 20 pptg (about 0.0012 to about 2.4 kg/m$^3$), more preferably from about 0.5 to about 20 pptg (about 0.06 to about 2.4 kg/m$^3$), based on the total volume of fluid, and the temperature for heating the polymer and the fructose ranges from about 110 to about 200° F. (about 43 to about 93° C.), preferably about 120 to about 180° F. (about 49 to about 82° C.). Further, the period of time for heating the components and breaking the gel ranges from about 0.25 to about 96 hours, in an alternate non-limiting embodiment of the invention ranges from about 1.0 to about 48 hours. In another non-limiting embodiment of the invention, the pH of the fluid is adjusted through the use of buffers to be at least about 6.0, preferably at least about 8.0.

In the case where glucose is used, the amount of glucose added ranges from about 0.01 to about 30 pptg (about 0.0012 to about 3.6 kg/m$^3$), more preferably from about 0.5 to about 20 pptg (about 0.06 to about 2.4 kg/m$^3$), based on the total volume of fluid, and the temperature for heating the polymer and the glucose ranges from about 120 to about 230° F. (about 49 to about 110° C.), preferably about 140 to about 220° F. (about 60 to about 105° C.). Further, the period of time for heating the components and breaking the gel ranges from about 0.25 to about 48 hours, in an alternate non-limiting embodiment of the invention ranges from about 0.5 to about 24 hours. In another non-limiting embodiment of the invention, the pH of the fluid is adjusted through the use of buffers to be at least about 6.0, preferably at least about 8.0.

In the situation where the polyol is selected from the group consisting of lactose, maltose, mannose, galactose and mixtures thereof, the amount of polyol added ranges from about 0.01 to about 30 pptg (about 0.0012 to about 3.6 kg/m$^3$), more preferably from about 0.5 to about 20.0 pptg (about 0.06 to about 2.4 kg/m$^3$), based on the total volume of fluid, and the temperature for heating the polymer and the polyol ranges from about 160 to about 280° F. (about 71 to about 138° C.), preferably about 180 to about 260° F. (about 82 to about 127° C.). Further, the period of time for heating the components and breaking the gel ranges from about 0.25 to about 48 hours, in an alternate non-limiting embodiment of the invention ranges from about 1.0 to about 16 hours. In another non-limiting embodiment of the invention, the pH of the fluid is adjusted through the use of buffers to be at least about 6.0, preferably at least about 8.0.

In the situation where the polyol is selected from the group consisting of alkyl glucoside, such as AG-6202 from Akzo Nobel Surfactants, the amount of polyol added ranges from about 0.1 to about 10 gptg, more preferably from about 0.25 to about 5.0 gptg, based on the total volume of fluid, and the temperature for heating the polymer and the polyol ranges from about 180 to about 270° F. (about 82 to about 132° C.), preferably about 190 to about 250° F. (about 88 to about 121° C.). Further, the period of time for heating the components and breaking the gel ranges from about 0.25 to about 48 hours, in an alternate non-limiting embodiment of the invention ranges from about 1.0 to about 16 hours. In another non-limiting embodiment of the invention, the pH of the fluid is adjusted through the use of buffers to be at least about 6.0, preferably at least about 8.0.

In the event where sorbitol is used, the amount of sorbitol added ranges from about 0.01 to about 15 pptg (about 0.0012 to about 1.8 kg/m$^3$), more preferably from about 0.5 to about 10 pptg (about 0.06 to about 1.2 kg/m$^3$), based on the total volume of fluid, and the temperature for heating the polymer and the sorbitol ranges from about 60 to about 240° F. (about 16 to about 116° C.), preferably about 120 to about 220° F. (about 49 to about 105° C.). Further, the period of time for heating the components and breaking the gel ranges from about 0.1 to about 96 hours, in an alternate non-limiting embodiment of the invention ranges from about 0.25 to about 48 hours. In another non-limiting embodiment of the invention, the pH of the fluid is adjusted through the use of buffers to be at least about 7.0, preferably at least about 8.5.

In one preferred, non-limiting embodiment of the invention, an enzyme breaker is also present. In some embodiments, enzyme breakers are preferred because they are not themselves consumed in the breaking process. Suitable enzyme breakers include, but are not necessarily limited to, hemi-cellulases, such as galactosidase and mannosidase hydrolases; cellulases; pectinases; alpha-amylases, and even undefined enzyme breakers and mixtures thereof derived from bacterial extracts that function in the method of this invention, and mixtures thereof. Specific, but non-limiting examples of suitable enzymes include GAMMANASE 1.0L hemicellulase from Novozymes, MULTIFECT GC cellulase from Genencor International, PECTINEX® ULTRA SPL pectinase from Novozymes, SPEZYME FRED alpha-amylase from Biocat, Inc., and PLEXGEL 10L available from Chemplex. The particular enzyme breakers useful in the method of the invention may have an activity in the pH range from about 2 to about 11; preferably from about 5 to about 10, and are effective to attack the specific galactomannan linkages in the galactomannan-based crosslinked polymer gel. In the case where the borate crosslinked polymer is a guar or guar-based polymer, the enzyme may be effective to break 1,4-β-D-mannosidic linkages and/or the 1,6-α-D-glactomannosidic linkages.

Another non-limiting embodiment of the invention involves the use of amylase enzymes with starch as the polyol source. The reaction of a beta amylase with starch will allow release of maltose into the fluid media. The reaction of a glucoamylase with starch will allow release of glucose into the fluid media. The reaction of an alpha amylase with starch will release glucose and oligosaccharides into the fluid media. In some cases the amylase may be more active at higher temperatures, with optimum activity near 212° F. (100° C.), such as with alpha amylase Termamyl from Novozymes. The enzyme cleavage of glucose and other saccharides from the starch may be temperature and pH controlled in the fluid media. As temperature is increased or pH is lowered the glucose, maltose, and other polyol's proportion can increase due to enhanced amylase activity with the starch. As glucose and other saccharides are released polyol degradation of a polysaccharide present in the fluid will occur, such as with guar or hydroxypropyl guar gelled fluids.

Similarly to the proportions of the polyol, it is difficult, if not impossible, to predict in advance and with accuracy the amount of enzyme breaker to be used in general in the practice of the method of this invention. This is due to the numerous complex and interrelated factors mentioned previously. Nevertheless, in order to give an approximate feel for the proportions of the divalent cation-generating materials to be used in the method of the invention, the amount of enzyme breaker added may range from about 0.001 to about 5.0 gptg (about 0.0001% by volume to about 0.5% BV), based on the total volume of the entire fluid; preferably from about 0.01 to about 3.0 gptg (about 0.001% BV to about 0.3% BV). (These proportions may be expressed in identical values in SI units of liters per thousand liters.) Enzymes are generally expensive and if they are employed, it is desirable to minimize their proportion to only what is necessary.

It is necessary, in some embodiments, to add pH buffers to the gelled aqueous fluid to increase the pH to generate active borate ion for crosslinking the polymers. Suitable buffers include, but are not necessarily limited to sodium hydroxide, potassium hydroxide, sodium carbonate, sodium sesquicarbonate, potassium carbonate, sodium bicarbonate, and mixtures thereof. The amount of the pH buffer may range from about 0.5 to about 30.0 pptg (about 0.06 to about 3.6 kg/m$^3$), based on the total volume of the entire fluid, preferably from about 1 to about 20 pptg (about 0.12 to about 2.4 kg/m$^3$).

In a typical fracturing operation, the fracturing fluid of the invention is pumped at a rate sufficient to initiate and propagate a fracture in the formation and to place propping agents into the fracture. A typical fracturing treatment would be conducted by hydrating a 20 lb to 30 lb/1000 gal water (weight/volume) (about 2.4 to about 3.6 kg/m$^3$) glactomannan-based polymer, such as guar, in a 2% (w/v) (166 lb/1000 gal (19.9 kg/m$^3$)) KCl solution at a pH ranging from about 6.0 to about 8.0. For crosslinking this pH range may be from about 8.8 to about 10.5. The polyol is added at this stage. It should be understood throughout the specification and claims that more than one polyol may be employed at a time. During the actual pumping, as described, the pH of the ambient temperature guar gel is raised by the addition of a buffer to about 9.5 to about 12.5, followed by the addition of the enzyme breaker, crosslinking agent, proppant, and other additives, if required.

The present invention will be explained in further detail in the following non-limiting Examples that are only designed to additionally illustrate the invention but not narrow the scope thereof.

GENERAL PROCEDURE FOR EXAMPLES 1–11

Using a Waring blender, 4.8 mls of Drilling Specialties Slurry Guar (guar gum suspended in a mineral oil slurry) was hydrated for 15 minutes within 500 mls of distilled water containing 10 grams KCl salt. A polyol such as 0.12 g of mannitol was added to the hydrated guar fluid. Another sample of the guar polymer fluid was mixed without adding any polyol. Mixed samples were then placed into 500 ml wide mouth Nalgene plastic bottles. Sodium sesquicarbonate high pH buffer (from FMC Corporation, 0.96 grams) was added to and allowed to dissolve in each 500 ml guar fluid to raise the pH of the fluids (took about 3 to 5 minutes of shaking the bottles). Next, 1.0 ml Spezyme FRED enzyme (from Bio-Cat Inc.) was quickly added followed by 0.875 mls borate crosslinker solution (from Benchmark Research). Each sample was capped and shaken vigorously for 60 seconds. The samples were placed in a water bath at 175° F. (79° C.) and visually observed every 30 minutes for viscosity reduction difference between the samples. The samples with polyol (e.g. mannitol) lost viscosity noticeably faster. Most gel breaking occurred over the first two hours.

Examples 1–3

Examples 1–3 show the effects of using no enzyme breaker with various levels of mannitol. The general procedure was followed where the Drilling Specialties Slurry Guar polymer loading was 30 pptg (pounds per thousand gallons) (3.6 kg/m$^3$). The crosslinker was as noted in the general procedure. The temperature was 175° F. (79° C.).

The results are presented in FIG. 1. It may be observed that the system of Example 2 containing 1.0 pptg mannitol (0.12 kg/m$^3$) reduced the viscosity considerably and faster than the degradation for the control Example 1 containing no polyol viscosity breaker. As expected, the Example 3 system containing more mannitol (2.0 pptg (0.24 kg/m$^3$)) reduced the viscosity to lower levels and at a faster rate.

The term ND30FW in this and other Examples refers to a 30.0 lbs/1000 gallon non-delayed (ND) borate crosslinked fluid in 2% KCl fresh water (FW).

Examples 4–5

Examples 1, 4 and 5 show the effects of using no enzyme breaker with various levels of sorbitol. The general procedure was followed where the Drilling Specialties Slurry Guar polymer loading was 30 pptg (3.6 kg/m$^3$). The crosslinker was as noted in the general procedure. The temperature was 175° F. (79° C.).

Figure 2:
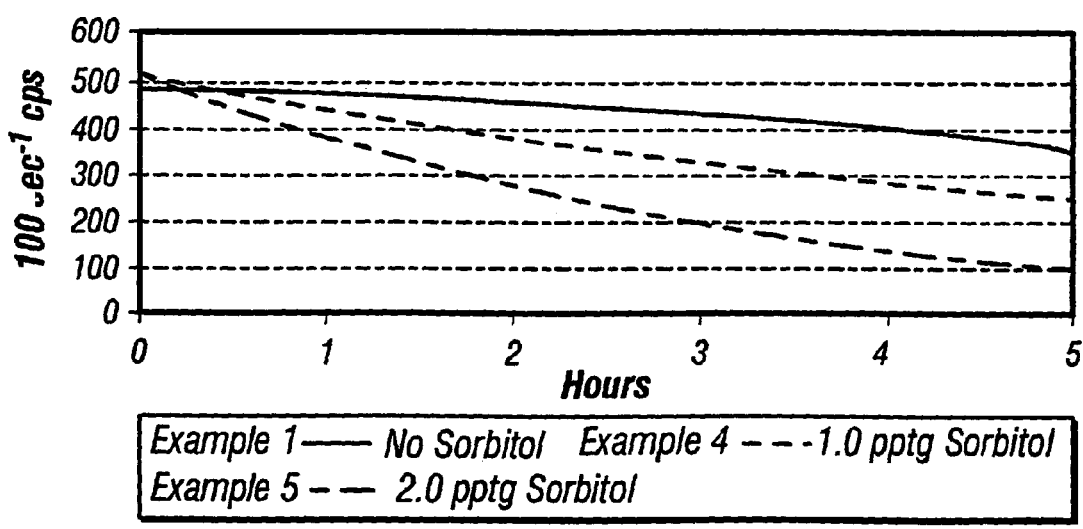
FIG. 2 is a graph of the effects of sorbitol on ND30FW at 175° F. (79° C.)

The results are given in FIG. 2. The graph for control Example 1 containing no sorbitol shows only the slow, unassisted viscosity degradation with time. Example 4 containing 1.0 pptg (0.12 kg/m$^3$) sorbitol demonstrated more rapid viscosity reduction. The Example 5 system containing 2.0 pptg (0.24 kg/m$^3$) sorbitol showed yet more rapid and greater viscosity reduction, as expected, beginning about 1 hour into the experiment. Given the temperature and amount of sorbitol, it may be that over the first 1 to 4 hours it is primarily sequestering of the borate ion that contributes to the gel breaking. Degradation of the backbone will start at about 1 to 2 hours in this case (175 F-79 C) but may not be the major contributor at 1 to 2 pptg sorbitol until about 24 hours at 175° F. (79 C).

Examples 6–7

Figure 3:
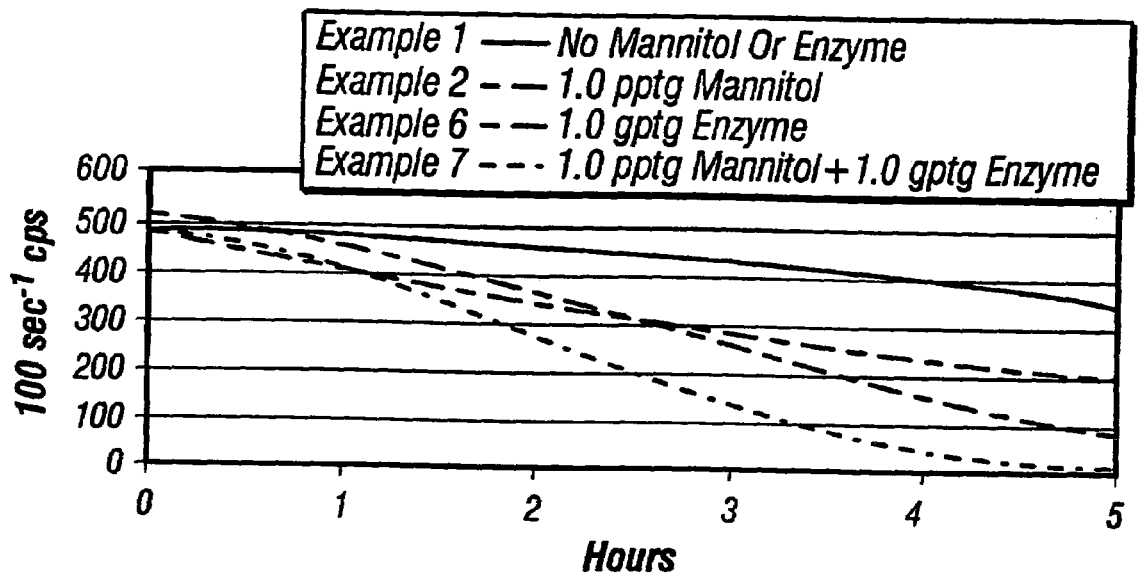
FIG. 3 is a graph of the effects an enzyme breaker Spezyme FRED with mannitol on ND30FW at 175° F. (79° C.)

Examples 6 and 7 show the effects of using the Spezyme FRED enzyme breaker (from Bio-Cat Inc.) with and without mannitol, one of the polyols of the invention. The general procedure was followed where the Drilling Specialties Slurry Guar polymer loading was 30 pptg (3.6 kg/m$^3$). The crosslinker was as noted in the general procedure. The temperature was 175° F. (79° C.):

The results are shown in FIG. 3. Again, comparative and control Example 1 used no enzyme or mannitol. Example 2 again employed only mannitol. Example 6 used 2.0 gptg of the "FRED" enzyme from Biocat but no mannitol, and the breaking rate was similar to that for Example 2 for about the first three hours, after which the gel broke faster and more completely as compared with Example 2. However, in the Example 7 system, which used 1.0 gptg of the FRED enzyme (as in Ex. 6) and 1.0 pptg (0.12 kg/m$^3$) mannitol (as in Ex. 2), the viscosity decrease was unexpectedly even more rapid and complete beginning at about 2 hours.

Example 8

Figure 4:
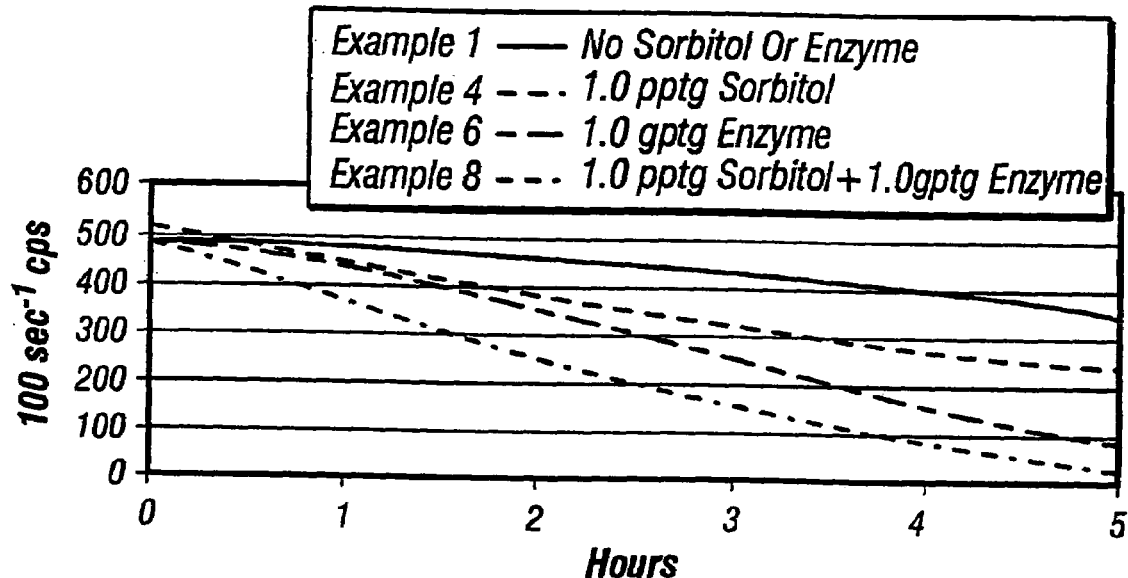
FIG. 4 is a graph of an enzyme breaker Spezyme FRED with sorbitol on ND30FW at 175° F. (79° C.)

FIG. 4 presents the curves for Examples 1, 4 and 6 again, along with the results for Example 8 where 1.0 pptg sorbitol (0.12 kg/m$^3$) was used as in Example 4 and 1.0 gptg of the Spezyme FRED enzyme breaker was used as in Example 6. The results shown in FIG. 4 indicated that unexpectedly sorbitol gives a more complete break of the gel even faster than with mannitol (Ex. 7). Note that the curve begins to decline noticeably after about 0.5 hour (Ex. 8).

Examples 9–11

Figure 5:
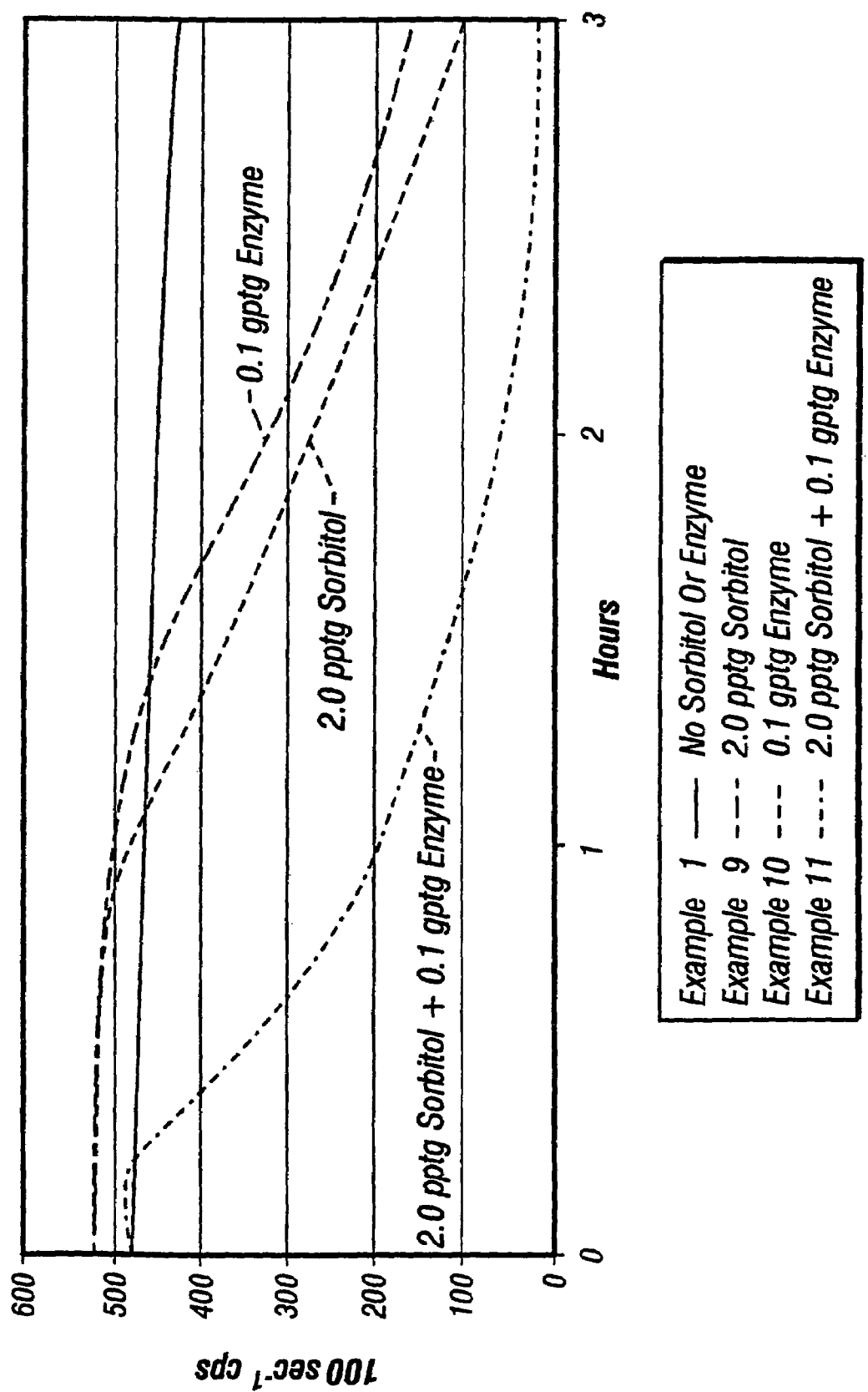
FIG. 5 is a graph of an enzyme breaker GAMMANASE 1.0L with sorbitol on ND30FW at 175° F. (79° C.)

Examples 9–11 show that using a polyol of the invention such as sorbitol permits the use of less enzyme breaker than normal to achieve the same results. The general procedure was followed as in Examples 1, 4, 6 and 8 of FIG. 4, except that 0.1 gptg of the enzyme was used in Examples 10 and 11 (one-tenth as much as in Examples 6 and 8), and 2.0 pptg sorbitol was used in Examples 9 and 11 (twice as much as in Examples 4 and 8). Additionally, the enzyme was GAMMANASE 1.0L, available from Novozymes. As can be seen from FIG. 5, excellent results were obtained: unexpectedly rapid and complete breaking began at less than 0.5 hour into the experiment. It may be clearly seen that the results obtained in Example 11 were better than what could be expected from the mere addition of the results of Examples 9 and 10. It is clear that the invention gives surprising, synergistic results. It is anticipated that by using the polyols of the invention that the amount of expensive enzyme used on a fracturing job could be reduced by half or by one-third, if not more.

Example 12

Table I below presents a chart of the pH of the indicated system as a function of borate ion and sorbitol concentration demonstrating a steady decrease in pH with increasing sorbitol, as expected in the method of this invention. The pH measurements were made 1.0 hour after mixing the materials.

TABLE I

| Borate Ion Verses Sorbitol Concentration Verses pH | | | | |
| --- | --- | --- | --- | --- |
| Temp, ° F. (° C.) | K$_2$CO$_3$ pH Buffer, pptg (kg/m$^3$) | Boric Acid, pptg (kg/m$^3$) | Sorbitol, pptg (kg/m$^3$) | pH |
| 73 (23) | 2.9 (0.35) | 1.2 (0.14) | None | 9.61 |
| 73 (23) | 2.9 (0.35) | 1.2 (0.14) | 1.0 (0.12) | 9.49 |
| 73 (23) | 2.9 (0.35) | 1.2 (0.14) | 2.0 (0.24) | 9.39 |
| 73 (23) | 2.9 (0.35) | 1.2 (0.14) | 4.0 (4.8) | 9.12 |
| 73 (23) | 2.9 (0.35) | 1.2 (0.14) | 8.0 (0.96) | 8.66 |

The Examples herein clearly demonstrate the efficacy of the method of the invention.

Examples 13–26 of Table II were conducted similarly to Examples 1–5, above, except with the changes as noted. It may be seen that the various polyols of this invention break the 30 pptg borate crosslinked guar fluid, and that glucose and fructose were particularly effective breakers, even for relatively short periods of time. All of the polyols were effective over longer periods of time, although some required higher concentrations to achieve comparable breaks.

The lack of crosslinked or uncrosslinked guar gel viscosity as seen in examples 14–19, and 23 once they were cooled to 75° F. (24° C.) after 16 hours at 200° F. (93° C.) indicate polysaccharide degradation (significant polymer chain reduction). It should be noted that 3 cps represents the viscosity of water, and typical guar products used for oilfield fracturing, as was used for all test herein, have a range in molecular weight from about 1.5 to 3.0 million. The 3 cps viscosities shown in examples 14–19 and 23 after 16 hours at 200° F. (93° C.) suggest polymer decomposition by the presence of and reaction with the indicated polyols and an increase in polyol concentration results in faster and more complete guar polymer degradation. The data from Table II also shows each polyol has its own unique reactivity with borate crosslinked guar at 200° F. (93° C.).

Examples 24–26 show that after 16 hours at 200° F. (93° C.) the 1.0 pptg sorbitol started to degrade the polymer compared to the no polyol baseline and at 10 pptg sorbitol the data shows a fair amount of polymer degradation, not simply uncrosslinking by borate ion sequestering. Complete, or near complete polymer degradation can be seen by the 16 hour viscosity data for the fructose, glucose, and lactose viscosities upon cool down (3 cps=viscosity of water). Thus, Examples 14–26 are evidence primarily of polymer degradation rather than borate ion sequestering. Significant polymer degradation has occurred when the polymer chains are no longer large enough to crosslink, which means a molecular weight of less than approximately 300,000 in polymer chain size, and a polymer chain also not large enough to show linear (uncrosslinked) hydrated guar polymer viscosity upon a cool down to 75 F (24° C.).

TABLE II

Polyol Breaker Effects at 200° F. (93° C.) With
30 pptg Borate Crosslinked Guar Fluid

| | | | | After 16 Hours at 200° F. (93° C.) | | |
|---|---|---|---|---|---|---|
| | | Viscosity at | | | | |
| | | Initial 75° F. | 200° F. (93° C.) after | 75° F. (24° C.) | 75° F. (24° C.) | 75° F. (24° C.) |
| Ex. | Breaker | (24° C.) pH | 0 Hours   1 Hour | Viscosity | pH | Color |
| 13 | None | 10.18 | 380   400 | 168 | 10.01 | Clear |
| 14 | 1.0 pptg Glucose | 10.16 | 415   25 | 3 | 9.56 | Clear |
| 15 | 2.0 pptg Glucose | 10.15 | 335   8 | 3 | 9.28 | Trace Caramel |
| 16 | 5.0 pptg Glucose | 10.13 | 85   6 | 3 | 9.35 | Slight Caramel |
| 17 | 10.0 pptg Glucose | 10.18 | 28   5 | 3 | 8.38 | Caramel |
| 18 | 1.0 pptg Fructose | 10.16 | 380   10 | 3 | 9.85 | Clear |
| 19 | 2.0 pptg Fructose | 10.17 | 45   8 | 3 | 9.75 | Clear |
| 20 | 1.0 pptg Maltose | 10.19 | 405   400 | 42 | 9.81 | Slight Caramel |
| 21 | 2.0 pptg Maltose | 10.12 | 395   35 | 16 | 9.74 | Caramel |
| 22 | 1.0 pptg Lactose | 10.16 | 435   170 | 75 | 9.92 | Clear |
| 23 | 2.0 pptg Lactose | 10.15 | 345   8 | 3 | 9.85 | Clear |
| 24 | 1.0 pptg Sorbitol | 10.12 | 460   455 | 127 | 9.98 | Clear |
| 25 | 5.0 pptg Sorbitol | 10.08 | 445   130 | 51 | 9.95 | Clear |
| 26 | 10.0 pptg Sorbitol | 10.09 | 270   12 | 12 | 9.96 | Clear |

Viscosity is listed at 100 sec$^{-1}$ shear using a Brookfield PVS Rheometer with B-5E Bob configuration. The crosslinker concentration was optimized for 200° F. (2.4 gptg boric acid solution).

Examples 27–30 of Table III were conducted similarly to Examples 13–26, above, except with the changes as noted. These Examples demonstrate that various polyols of this invention break the 30 pptg borate crosslinked hydroxypropyl guar (i.e., a derivatized guar) fluid and that glucose and fructose continue to be particularly effective breakers, even for relatively short periods of time such as 1 hour. It can be also noted that fructose was able to degrade the crosslinked hydroxypropyl guar to water viscosity (3 cps) after 16 hours at 175° F. (79° C.), and appears to be a more effective breaker at lower temperatures than glucose given the same physical and chemical conditions.

Examples 31–33 of Table IV were conducted similarly to Examples 13–26, above, except with the changes as noted. These Examples demonstrate that various polyols of this invention break the 30 pptg borate crosslinked hydroxypropyl guar fluid, and that glucose breaker effectiveness increases with increasing proportion over the range shown, even for relatively short periods of time such as 1 and 3 hours. It can be also noticed that the rate of polymer degradation of crosslinked hydroxypropyl guar polymer with glucose increases considerably from 175° F. to 200° F. (79 to 93° C.), as glucose break data in Tables III and IV shows (Examples 28 and 33). It appears that each polyol has

TABLE III

Polyol Breaker Effects at 175° F. (79° C.) With
30 pptg Borate Crosslinked Hydroxypropyl Guar Fluid

| | | | | After 16 Hours at 175° F. (79° C.) | | |
|---|---|---|---|---|---|---|
| | | Viscosity at | | | | |
| | | Initial 75° F. | 175° F. (79° C.) after | 75° F. (24° C.) | 75° F. (24° C.) | 75° F. (24° C.) |
| Ex. | Breaker | (24° C.) pH | 0 Hours   1 Hour | Viscosity | pH | Color |
| 27 | None | 9.78 | 475   465 | 405 | 9.69 | Clear |
| 28 | 20.0 pptg Glucose | 9.79 | 415   25 | 285 | 9.09 | Slight Caramel |
| 29 | 10.0 pptg Fructose | 9.73 | 420   14 | 3 | 9.21 | Clear |
| 30 | 20.0 pptg Fructose | 9.78 | 305   8 | 3 | 9.02 | Clear |

Viscosity is listed at 100 sec$^{-1}$ shear using a Brookfield PVS Rheometer with B-5E Bob configuration. Crosslinker concentration optimized for 175° F. (79° C.) in HPG Fluid (6.0 gptg boric acid solution)

its own particular temperature range where they optimally work in polysaccharide polymer chain decomposition.

TABLE IV

Polyol Breaker Effects at 200° F. (93° C.) With 30 pptg Borate Crosslinked Hydroxypropyl Guar Fluid

| | | Initial 75° F. (24° C.) | | | After 3 Hours at 200° F. (93° C.) | | |
|---|---|---|---|---|---|---|---|
| Ex. | Breaker | pH | 200° F. (93° C.) 0 Hours | 200° F. (93° C.) after 1 Hour | 75° F. (24° C.) Viscosity | 75° F. (24° C.) pH | 75° F. (24° C.) Color |
| 31 | None | 10.25 | 400 | 405 | 1420 | 10.02 | Clear |
| 32 | 5.0 pptg Glucose | 10.20 | 415 | 25 | 32 | 9.72 | Clear |
| 33 | 10.0 pptg Glucose | 10.16 | 420 | 14 | 3 | 9.34 | Caramel |

Viscosity is listed at 100 sec$^{-1}$ shear using a Brookfield PVS Rheometer with B-5E Bob configuration. Crosslinker concentration optimized for 200° F. in HPG Fluid (7.0 gptg boric acid solution)

Examples 34–39 of Table V were conducted similarly to Examples 13–26, above, except with the changes as noted. These Examples demonstrate that various polyols of this invention break the 60 pptg borate non-crosslinked guar fluid, and that the glucose breaker of this invention was effective over the various time periods shown. These Examples are evidence that the polyols break down the polysaccharide backbone directly, rather than simply sequestering the crosslinking ion, if present. Evidence of possible caramelization (short chain glucose polymerization) was observed within the glucose breaker Examples, with initial fluid pH appearing to be a primary factor.

TABLE V

Polyol Break Tests at 200° F. (93° C.) With 60 pptg Non-Crosslinked Guar Fluid

| | | Initial 75° F. (24° C.) Fluid Properties | | | Final 75° F. (24° C.) Fluid Properties After Heated | | |
|---|---|---|---|---|---|---|---|
| Ex. | Breaker | Viscosity | pH | Hours at 200° F. (93° C.) | 75° F. (24° C.) Viscosity | 75° F. (24° C.) pH | Color |
| 34 | None | 270 | 10.61 | 6 | 181 | 10.22 | Clear |
| 35 | None | 271 | 10.60 | 16 | 67 | 10.08 | Clear |
| 36 | None | 278 | 7.97 | 96 | 29 | 9.22 | Clear |
| 37 | 10.0 pptg Glucose | 261 | 10.59 | 6 | 48 | 8.12 | Caramel |
| 38 | 10.0 pptg Glucose | 263 | 10.58 | 16 | 21 | 7.72 | Caramel |
| 39 | 10.0 pptg Glucose | 265 | 7.97 | 96 | 11 | 5.30 | Trace Caramel |

Viscosity is listed at 100 sec$^{-1}$ shear using a Brookfield PVS Rheometer with B-5E Bob configuration.

TABLE VI

Crosslinker Absorption Effects of Polyols at 75° F. (24° C.) With 30 pptg Borate Crosslinked Guar Fluid

| | | Initial 75° F. (24° C.) | Viscosity at 75° F. (24° C.) after | | | 75° F. (24° C.) pH |
|---|---|---|---|---|---|---|
| Ex. | Breaker | pH | 0 Hours | 1 Hours | 2 Hours | After 2 Hours |
| 40 | None | 10.01 | 1420 | 1030 | 880 | 9.92 |
| 41 | 5.0 pptg Glucose | 10.02 | 1475 | 980 | 900 | 9.89 |
| 42 | 10.0 pptg Glucose | 10.08 | 1490 | 990 | 920 | 9.64 |
| 43 | 2.5 pptg Fructose | 9.98 | 1180 | 315 | 305 | 9.79 |
| 44 | 5.0 pptg Fructose | 9.94 | 635 | 305 | 295 | 9.71 |
| 45 | 10.0 pptg Fructose | 9.90 | 128 | 124 | 104 | 9.55 |
| 46 | 2.5 pptg Lactose | 10.00 | 1255 | 1170 | 690 | 9.81 |
| 47 | 5.0 pptg Lactose | 10.04 | 1430 | 900 | 830 | 9.72 |
| 48 | 10.0 pptg Lactose | 9.95 | 1115 | 1255 | 730 | 9.65 |
| 49 | 2.5 pptg Sorbitol | 10.00 | 1255 | 365 | 310 | 9.72 |
| 50 | 5.0 pptg Sorbitol | 9.92 | 530 | 305 | 300 | 9.42 |
| 51 | 7.5 pptg Sorbitol | 9.80 | 114 | 122 | 118 | 9.28 |

Viscosity is listed at 100 sec$^{-1}$ shear using a Brookfield PVS Rheometer with B-5E Bob configuration. Crosslinker concentration optimized for 75° F. (24° C.) (1.25 gptg boric acid solution).

Figure 6:
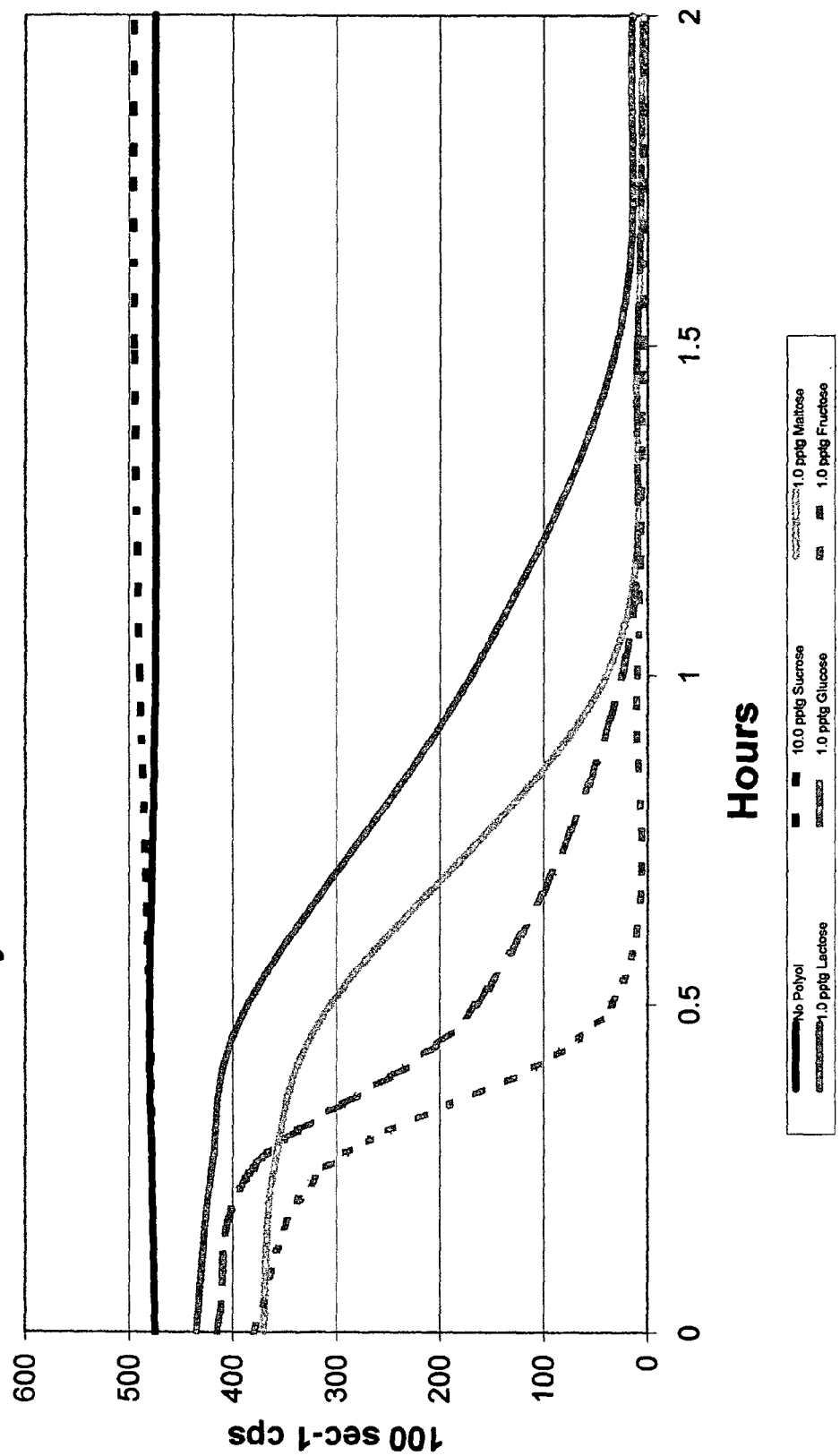
FIG. 6 is a graph of viscosity as a function of time for B9 Emerald FRAQ 30 breaker tests at 200° F. (93° C.) using various polyols.

FIG. 6 is a graph of viscosity as a function of time showing the breaking of B$^9$ Emerald FRAQ™ 30 at 200° F.

Examples 40–51 of Table VI measured crosslinker absorption effects of various polyols at 75° F. (24° C.) with 30 pptg borate crosslinked guar fluids. The data shows, with results from Tables II, III, and IV in mind, that some polyols can work by a combination of sequestering of borate ions and by direct degradation activity on the polymer backbone (such as the fructose data in Tables II and VI), while other polyols appear to work primarily by polymer degradation, appearing to have no significant ability to sequester borate ion in the viscosity breaking process (such as the glucose data in Tables II, IV, and VI).

(93° C.) using a variety of different polyols, most at the concentration of 1.0 pptg showing that different polyols give different breaking profiles under similar conditions. It can be noticed in FIG. 6 that the non-reducing sugar, sucrose, used at 10 times the amount for the other polyol tests, did not show breaking activity like the other polyols over the 2 hour at 200° F. (93° C.) test period, demonstrating that non-reducing sugars do not readily act as gel breakers under alkaline conditions. Thus, non-reducing sugars are a class of polyols that appear to lack utility for this invention.

Figure 7:
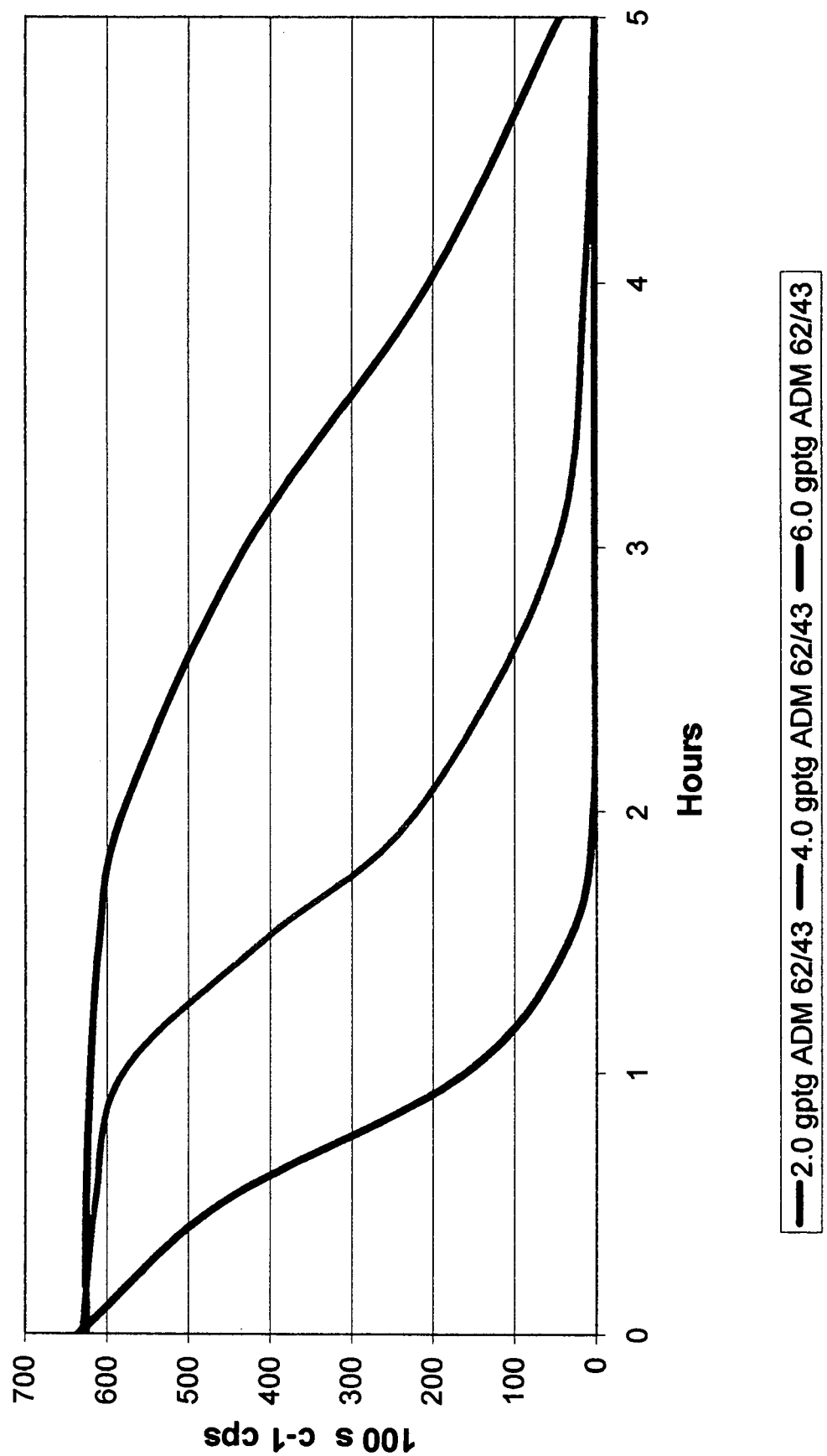
FIG. 7 is a graph of viscosity as a function of time for B9 Emerald FRAQ 30 with ADM 62/43 polyol breaker in various concentrations at 150° F. (66° C.)

FIG. 7 is a graph of viscosity as a function of time showing how B9 Emerald FRAQ™ 30 can be broken with ADM 62/43 polyol breaker in various concentrations at 150° F. (66° C.). Generally, the greater the amount of polyol, the faster the gel is broken. ADM 62/43 polyol is corn syrup, which is corn starch broken down to glucose available from Archer Daniels Midland.

Figure 8:
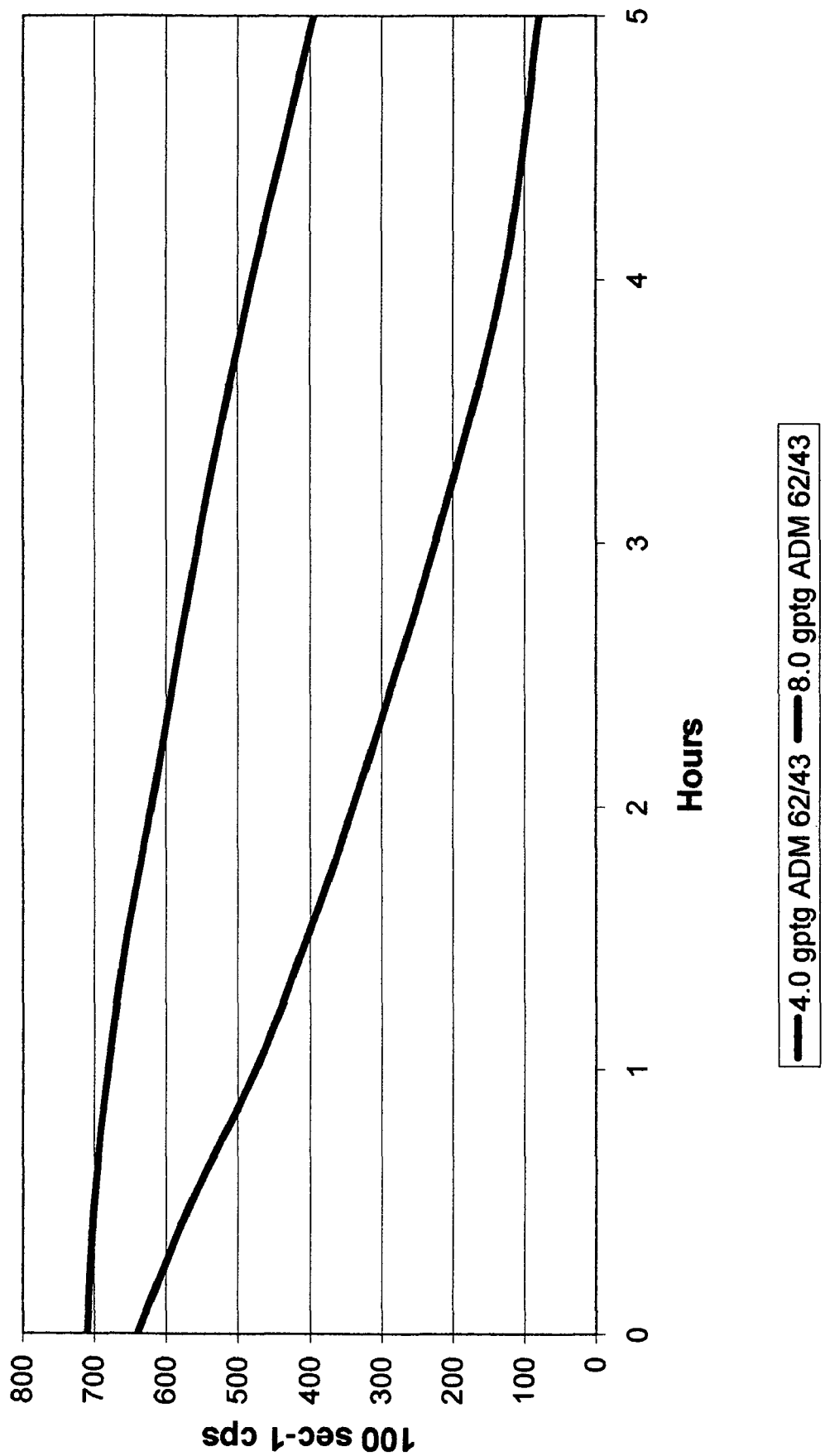
FIG. 8 is a graph of viscosity as a function of time for B9 Emerald FRAQ 30 with ADM 62/43 polyol breaker tests in two different concentrations at 125° F. (57° C.)

FIG. 8 is a graph of viscosity as a function of time showing the breaking of B9 Emerald FRAQ™ 30 with ADM 62/43 polyol breaker in two different concentrations at 125° F. (57° C.). Again, generally as more polyol is used, the gel breaks faster.

Figure 9:
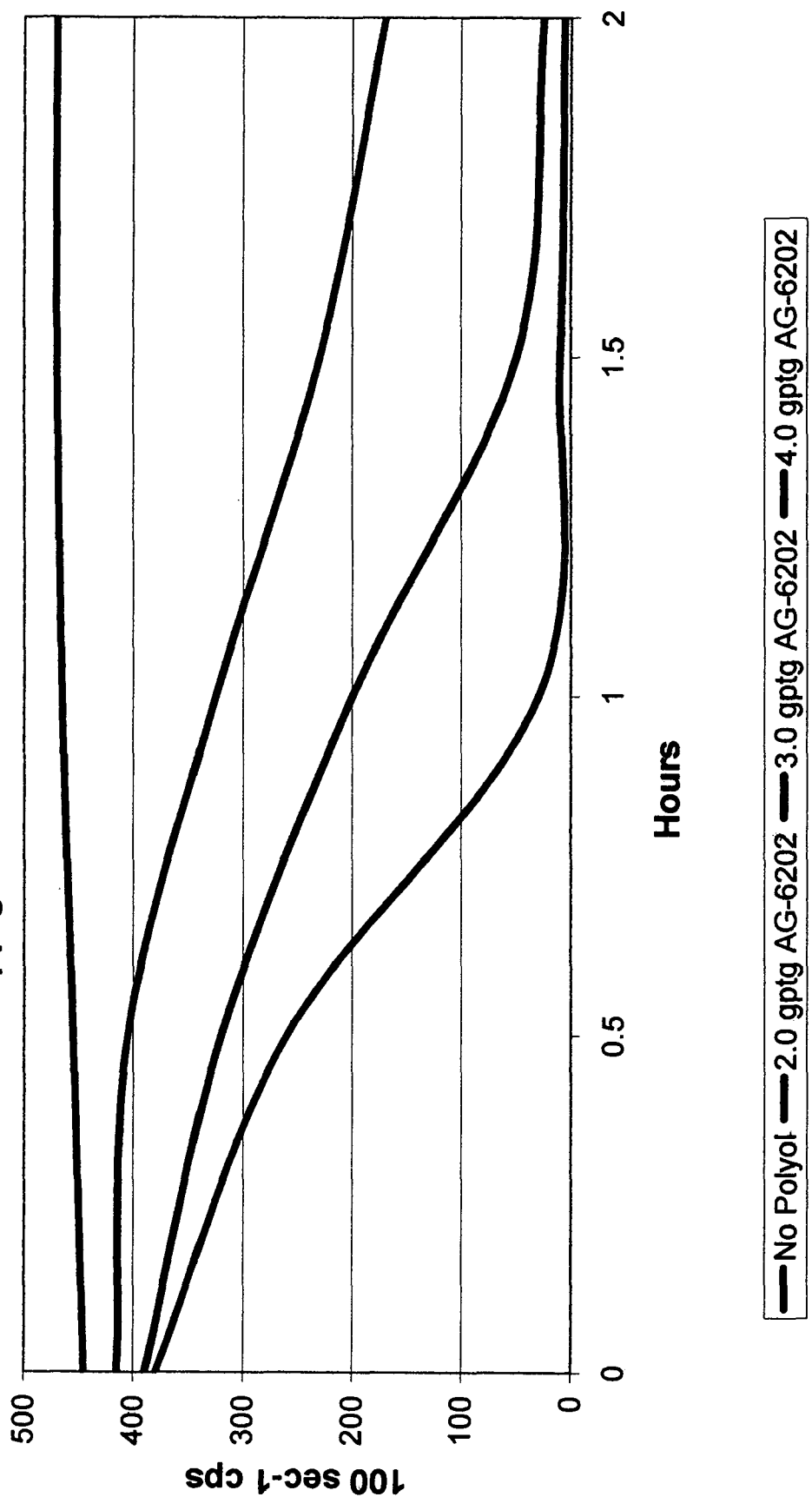
FIG. 9 is a graph of viscosity as a function of time for borate crosslinked guar using alkyl glucoside polyol breaker in various concentrations at 200° F. (93° C.)

FIG. 9 is a graph of viscosity as a function of time showing the breaking of borate crosslinked guar using alkyl glucoside polyol in various concentrations at 200° F. (93° C.). Again, generally as more polyol is used, the gel breaks faster.

Figure 10:
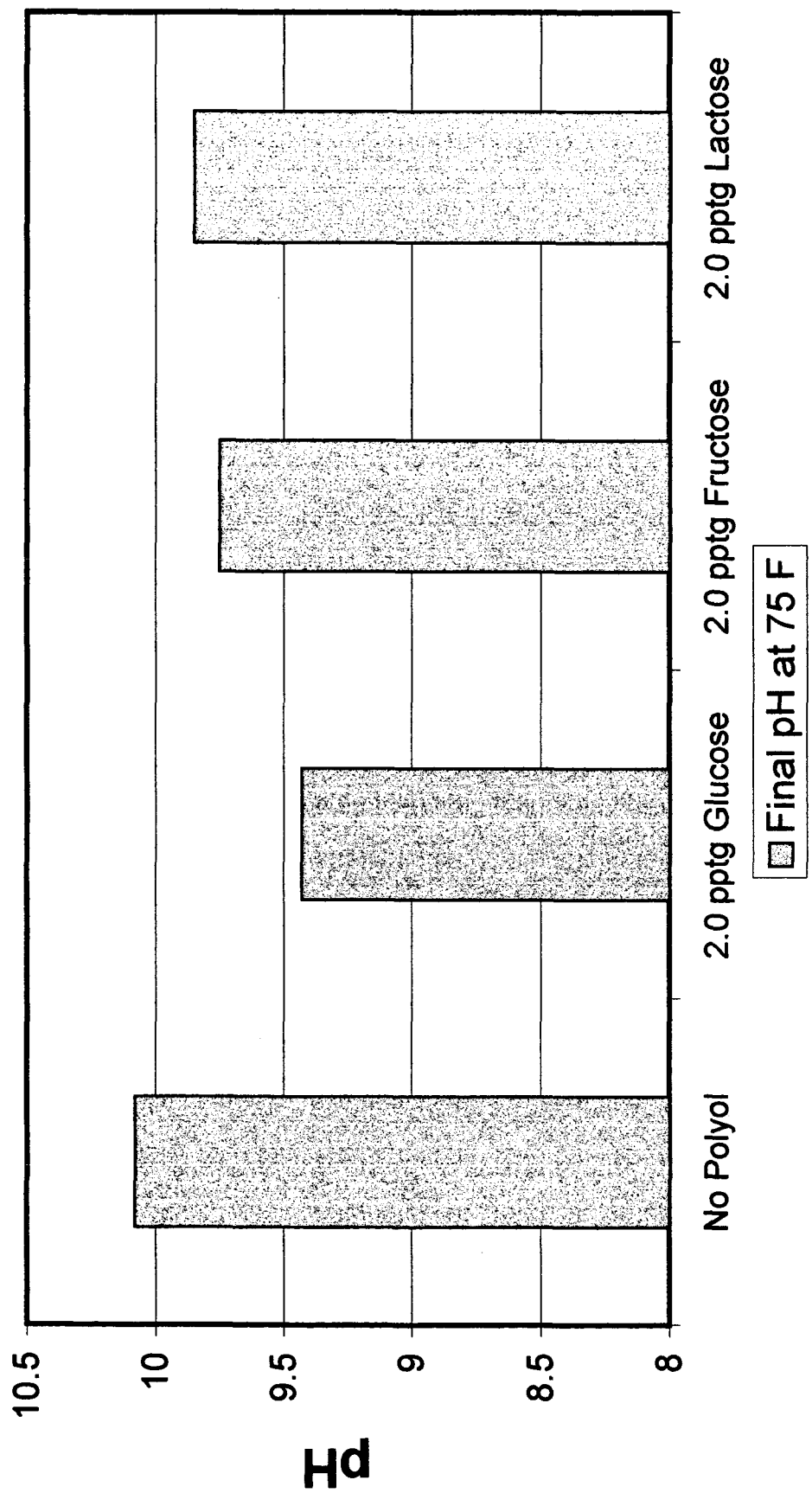
FIG. 10 is a chart of polyol fluid pH for 30 pptg borate crosslinked guar fluid using various polyols at 2.0 pptg after 16 hours at 200° F. (93° C.) measured at 75° F. (24° C.)

FIG. 10 is a chart of polyol fluid pH for 30 pptg borate crosslinked guar fluid using various polyols at 2.0 pptg after 16 hours at 200° F. (93° C.) measured at 75° F. (24° C.). It can be seen that the pH is reduced at each instance as compared with the control, where the reduction is on the order of glucose>fructose>lactose.

FIG. 11 is a graph of viscosity as a function of time showing how 30 pptg borate-crosslinked guar can be broken by encapsulated lactose at two different concentrations. Again, the more encapsulated lactose used, the faster and more complete is the break. The encapsulated lactose was prepared by Fritz Industries. These examples demonstrate that the polyols of this invention can be successfully employed in encapsulated form to delay breaking.

Components such as ethylene glycol and ethanol, if present in the fluid may interact negatively with the polyol breaking process. At low concentration, glycols or alcohols will slow down the polyol breaking activity and at high concentrations they can significantly decrease the polyol breaking activity (polymer degradation over time). Sodium bromate, an oxidizer, also shows a negative influence on the reactions polyol has with borate crosslinked guar. FIG. 12 is a graph of viscosity as a function of time showing how some of these chemicals negatively influence polyol breaking process with borate crosslinked guar.

It has been additionally found that the presence of amine compounds influence the polyol breaking activity with borate crosslinked guar fluids. Some amines slow the polyol activity and some enhance the polyol breaking activity. Amines such as sodium iminodisuccinate and pentasodium diethylenetriaminepentaacetate can slow the polyol activity, and amines such as glycine and lysine can enhance the polyol breaking activity with borate crosslinked guar. Depending upon the particular application of the chemistry of this invention, one may need to slow the breaking activity or accelerate the breaking activity. Some amines negatively influence the polyol breaking activity and some amines enhance the breaking process. FIG. 13 is a graph of viscosity as a function of time showing how amines influence the polyol breaking activity with borate crosslinked guar.

Among other items, the type and amount of pH buffer may also play an important role on the polyol activity. It appears that sodium hydroxide, and other hydroxide pH buffers, will reduce the polyol breaking activity with polysaccharide gelled fluids. Polyol breaking activity can be enhanced by the co-use of alkali metal hydroxides together with carbonate pH buffers. Use of carbonate pH buffers, such as potassium carbonate, sodium sesquicarbonate, sodium bicarbonate, and other carbonate pH buffers may enhance or increase the polyol breaking activity with polysaccharides. Other compounds than what has been listed, which can control fluid pH or chemically alter the polyol activity of breaking a polysaccharide polymer, especially at fluid temperatures of >120° F. (49° C.), may be present in the fluid and have utility to enhance or retard breaking activity. FIG. 14 is a graph of viscosity as a function of time showing how type of pH buffer influences the activity of a fixed amount of polyol breaker. In this case the polyol is 0.5 pptg glucose. The data shows carbonate pH buffers are compatible with glucose breaking borate crosslinked guar and the presence of bicarbonate ions appear to accelerate the breaking reactions that occur.

In the foregoing specification, the invention has been described with reference to specific embodiments thereof, and has been demonstrated as effective in providing a method and composition for breaking polymer gelled fracturing fluids with polyols that breakdown the polysaccharide backbone directly. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of polymers, optional crosslinkers, buffers, polyols, and other components falling within the claimed parameters, but not specifically identified or tried in a particular composition, are anticipated and expected to be within the scope of this invention.

I claim:

1. A method for breaking viscosity of aqueous fluids gelled with polysaccharides comprising
   adding to an aqueous fluid gelled with at least one polysaccharide, at least one low molecular weight polyol selected from the group consisting of glycerol, glucose, lactose, rhamnose, mannose, alkyl glucoside and mixtures thereof;
   subjecting the polymer and the polyol to heat for an effective period of time and where the concentration of the polyol is effective to break down the polymer backbone directly in the absence of an oxidizer breaker or an enzyme breaker; and
   breaking the viscosity of the aqueous fluid.

2. The method of claim 1 where in adding the polyol, the polyol has at least one hydroxyl group on two adjacent carbon atoms and is selected from the group consisting of monosaccharides and disaccharides, and acid, acid salt, alcohol, alkyl and amine derivatives of these saccharides.

3. The method of claim 1 further comprising raising the pH of the aqueous fluid.

4. The method of claim 3 where the pH of the aqueous fluid is raised with a compound selected from the group consisting of an alkali metal hydroxide, alkali metal carbonate, bicarbonate, sesquicarbonate, and mixtures thereof.

5. The method of claim 1 where in adding the polyol, the amount of polyol added ranges from about 0.01 to about 20 pptg (about 0.0012 to about 2.4 kg/m$^3$) based on the total volume of fluid.

6. The method of claim 1 where in subjecting the polymer and the polyol to heat, the temperature ranges from about 120 to about 270° F. (about 49 to about 132° C.).

7. The method of claim 1 where in subjecting the polymer and the polyol to heat for an effective period of time, the period of time ranges from about 0.5 to about 48 hours.

8. The method of claim 1 where the polysaccharide is crosslinked.

9. The method of claim 8 where the polysaccharide is crosslinked with an ion selected from the group consisting of borate ion, zirconate ion, titanate ion, and combinations thereof.

10. The method of claim 1 where the polyol is glucose and the amount of glucose added ranges from about 0.01 to about 20 pptg (about 0.0012 to about 2.4 kg/m$^3$) based on the total volume of fluid, and where in subjecting the polymer and the glucose to heat, the temperature ranges from about 140 to about 220° F. (about 60 to about 105° C.).

11. The method of claim 10 where in subjecting the polymer and the glucose to heat for an effective period of time, the period of time ranges from about 0.5 to about 24 hours.

12. The method of claim 10 further comprising raising the pH to at least 8.0.

13. The method of claim 1 where the polyol is mannose, and the amount of polyol added ranges from about 0.01 to about 20 pptg (about 0.0012 to about 2.4 kg/m$^3$) based on the total volume of fluid, and where in subjecting the polymer and the polyol to heat, the temperature ranges from about 180 to about 260° F. (about 82 to about 127° C.).

14. The method of claim 13 where in subjecting the polymer and the polyol to heat for an effective period of time, the period of time ranges from about 1.0 to about 16 hours.

15. The method of claim 13 further comprising raising the pH to at least 8.0.

16. The method of claim 1 where the polyol is alkyl glucoside and the amount of alkyl glucoside added ranges from about 0.25 to about 5.0 gptg based on the total volume of fluid, and where in subjecting the polymer and the alkyl glucoside to heat, the temperature ranges from about 190 to about 250° F. (about 88 to about 121° C.).

17. The method of claim 16 where in subjecting the polymer and the alkyl glucoside to heat for an effective period of time, the period of time ranges from about 1.0 to about 16 hours.

18. The method of claim 16 further comprising raising the pH to at least 8.0.

19. A method for breaking viscosity of aqueous fluids gelled with polysaccharides comprising
  adding glucose to an aqueous fluid gelled with at least one polysaccharide, where the amount of glucose ranges from about 0.01 to about 20 pptg (about 0.0012 to about 2.4 kg/m$^3$) based on the total volume of fluid; and
  subjecting the polymer and the polyol to a temperature ranging from about 140 to about 220° F. (about 60 to about 105° C.) for an effective period of time and where the concentration of the polyol is effective to break down the polymer backbone directly;
where the method is conducted in the absence of an oxidizer breaker or an enzyme breaker.

20. The method of claim 19 further comprising raising the pH of the aqueous fluid to at least 8.0.

21. The method of claim 20 where the pH of the aqueous fluid is raised with a compound selected from the group consisting of an alkali metal hydroxide, alkali metal carbonate, bicarbonate, sesquicarbonate, and mixtures thereof.

22. The method of claim 19 where the polysaccharide is crosslinked.

23. The method of claim 22 where the polysaccharide is crosslinked with an ion selected from the group consisting of borate ion, zirconate ion, titanate ion, and combinations thereof.

24. A method for breaking viscosity of aqueous fluids gelled with polysaccharides comprising
  adding lactose to an aqueous fluid gelled with at least one polysaccharide, where the amount of lactose ranges from about 0.01 to about 20 pptg (about 0.0012 to about 2.4 kg/m$^3$) based on the total volume of fluid; and
  subjecting the polymer and the polyol to a temperature ranging from about 180 to about 260° F. (about 82 to about 127° C.) for an effective period of time and where the concentration of the polyol is effective to break down the polymer backbone directly;
where the method is conducted in the absence of an oxidizer breaker or an enzyme breaker.

25. The method of claim 24 further comprising raising the pH of the aqueous fluid to at least 8.0.

26. The method of claim 25 where the pH of the aqueous fluid is raised with a compound selected from the group consisting of an alkali metal hydroxide, alkali metal carbonate, bicarbonate, sesquicarbonate, and mixtures thereof.

27. The method of claim 24 where the polysaccharide is crosslinked.

28. The method of claim 27 where the polysaccharide is crosslinked with an ion selected from the group consisting of borate ion, zirconate ion, titanate ion, and combinations thereof.

29. A method for breaking viscosity of aqueous fluids gelled with polysaccharides comprising
  adding alkyl glucoside to an aqueous fluid gelled with at least one polysaccharide, where the amount of alkyl glucoside ranges from about 0.25 to about 5.0 gptg based on the total volume of fluid; and
  subjecting the polymer and the polyol to a temperature ranging from about 190 to about 250° F. (about 88 to about 121° C.) for an effective period of time and where the concentration of the polyol is effective to break down the polymer backbone directly;
where the method is conducted in the absence of an oxidizer breaker or an enzyme breaker.

30. The method of claim 29 further comprising raising the pH of the aqueous fluid to at least 8.0.

31. The method of claim 30 where the pH of the aqueous fluid is raised with a compound selected from the group consisting of an alkali metal hydroxide, alkali metal carbonate, bicarbonate, sesquicarbonate, and mixtures thereof.

32. The method of claim 31 where the polysaccharide is crosslinked.

33. The method of claim 32 where the polysaccharide is crosslinked with an ion selected from the group consisting of borate ion, zirconate ion, titanate ion, and combinations thereof.

* * * * *